US00RE47002E

(19) United States
(12) Reissued Patent
Ferguson et al.

(10) Patent Number: US RE47,002 E
(45) Date of Reissued Patent: *Aug. 21, 2018

(54) CONTROLLING A VEHICLE HAVING INADEQUATE MAP DATA

(71) Applicant: Waymo LLC, Mountain View, CA (US)

(72) Inventors: David I. Ferguson, San Francisco, CA (US); Dmitri Dolgov, Mountain View, CA (US)

(73) Assignee: Waymo LLC, Mountain View, CA (US)

( * ) Notice: This patent is subject to a terminal disclaimer.

(21) Appl. No.: 15/367,112

(22) Filed: Dec. 1, 2016

Related U.S. Patent Documents

Reissue of:
(64) Patent No.: 8,903,591
Issued: Dec. 2, 2014
Appl. No.: 14/164,565
Filed: Jan. 27, 2014

U.S. Applications:
(63) Continuation of application No. 13/943,867, filed on Jul. 17, 2013, now Pat. No. 8,676,430, which is a continuation of application No. 13/465,348, filed on May 7, 2012, now Pat. No. 8,521,352.

(51) Int. Cl.
*G01C 22/00* (2006.01)
*G05D 1/02* (2006.01)

(52) U.S. Cl.
CPC ..... *G05D 1/0272* (2013.01)

(58) Field of Classification Search
CPC ..... G05D 1/0272
USPC ..... 701/25
See application file for complete search history.

(56) References Cited

U.S. PATENT DOCUMENTS 5,036,935 A 8/1991 Kohara
5,122,957 A 6/1992 Hattori
5,307,419 A * 4/1994 Tsujino ..... G05D 1/0223 348/119
5,774,069 A * 6/1998 Tanaka et al. ..... 340/903
5,875,412 A * 2/1999 Sulich ..... G01C 21/3415 340/988

(Continued)

OTHER PUBLICATIONS

Non-Final Office Action dated Sep. 8, 2017 for U.S. Appl. No. 15/367,115.

(Continued)

*Primary Examiner* — Michelle Tarae
(74) *Attorney, Agent, or Firm* — McDonnell Boehnen Hulbert & Berghoff LLP

(57) ABSTRACT

A vehicle can be controlled in a first autonomous mode of operation by at least navigating the vehicle based on map data. Sensor data can be obtained using one or more sensors of the vehicle. The sensor data can be indicative of an environment of the vehicle. An inadequacy in the map data can be detected by at least comparing the map data to the sensor data. In response to detecting the inadequacy in the map data, the vehicle can be controlled in a second autonomous mode of operation and a user can be prompted to switch to a manual mode of operation. The vehicle can be controlled in the second autonomous mode of operation by at least obtaining additional sensor data using the one or more sensors of the vehicle and navigating the vehicle based on the additional sensor data.

40 Claims, 7 Drawing Sheets

(56) References Cited

U.S. PATENT DOCUMENTS

| | | | | |
|---|---|---|---|---|
| 6,151,539 | A * | 11/2000 | Bergholz | G01S 13/931 340/435 |
| 7,268,700 | B1 | 9/2007 | Hoffberg | |
| 7,510,038 | B2 * | 3/2009 | Kaufmann | B62D 1/286 180/167 |
| 8,078,338 | B2 * | 12/2011 | Pack et al. | 701/1 |
| 8,108,092 | B2 * | 1/2012 | Phillips et al. | 701/23 |
| 8,618,922 | B2 * | 12/2013 | Debouk | B60W 50/035 340/439 |
| 2003/0058444 | A1 * | 3/2003 | Nara et al. | 356/394 |
| 2003/0134648 | A1 * | 7/2003 | Reed et al. | 455/456 |
| 2009/0248231 | A1 * | 10/2009 | Kamiya | 701/23 |
| 2010/0256836 | A1 * | 10/2010 | Mudalige | 701/2 |

OTHER PUBLICATIONS

Non-Final Office Action dated Sep. 22, 2017 for U.S. Appl. No. 15/367,118.
Non-Final Office Action dated Sep. 22, 2017 for U.S. Appl. No. 15/367,122.
Non-Final Office Action dated Sep. 22, 2017 for U.S. Appl. No. 15/367,127.

* cited by examiner

CONTROLLING A VEHICLE HAVING INADEQUATE MAP DATA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. patent application Ser. No. 13/943,867 filed on Jul. 17, 2013, and entitled "Controlling a Vehicle Having Inadequate Map Data," which is a continuation of U.S. patent application Ser. No. 13/465,348 (now U.S. Pat. No. 8,521,352), filed on May 7, 2012, and entitled "Controlling a Vehicle Having Inadequate Map Data," all of which are herein incorporated by reference as if fully set forth in this description.

BACKGROUND

Some vehicles are configured to operate in an autonomous mode in which the vehicle navigates through an environment with little or no input from a driver. Such a vehicle typically includes sensors that are configured to sense information about the environment. The vehicle can use the sensed information to navigate through the environment. For example, if the sensors sense that the vehicle is approaching an obstacle, the vehicle can navigate around the obstacle.

SUMMARY

In a first aspect, a method is provided. The method includes controlling a vehicle in a first autonomous mode of operation. Controlling the vehicle in the first autonomous mode of operation includes navigating the vehicle based on map data. The method includes obtaining sensor data using one or more sensors of the vehicle. The sensor data is indicative of an environment of the vehicle. The method includes detecting an inadequacy in the map data. Detecting the inadequacy in the map data includes comparing the map data to the sensor data. The method includes, in response to detecting the inadequacy in the map data, controlling the vehicle in a second autonomous mode of operation and prompting a user to switch to a manual mode of operation. Controlling the vehicle in the second autonomous mode of operation includes obtaining additional sensor data using the one or more sensors of the vehicle and navigating the vehicle based on the additional sensor data.

In a second aspect, a vehicle is provided. The vehicle includes at least one sensor and a computer system. The at least one sensor is configured to obtain first sensor data. The first sensor data is indicative of an environment of the vehicle when the vehicle is in a first autonomous mode of operation. The at least one sensor is configured to obtain second sensor data. The second sensor data is indicative of an environment of the vehicle when the vehicle is in a second autonomous mode of operation. The computer system is configured to control the vehicle in the first autonomous mode of operation by at least navigating the vehicle based on map data. The computer system is configured to detect an inadequacy in the map data by at least comparing the map data to the first sensor data. The computer system is configured to, in response to detecting the inadequacy in the map data, (i) control the vehicle in the second autonomous mode of operation by at least navigating the vehicle based on the second sensor data, and (ii) prompt a user to switch to a manual mode of operation.

In a third aspect, a non-transitory computer-readable medium is provided. The medium includes stored instructions that are executable by a computer system to cause the computer system to perform functions. The functions include controlling a vehicle in a first autonomous mode of operation. Controlling the vehicle in the first autonomous mode of operation includes navigating the vehicle based on map data. The functions include receiving sensor data from one or more sensors of the vehicle. The sensor data is indicative of an environment of the vehicle. The functions include detecting an inadequacy in the map data. Detecting the inadequacy in the map data includes comparing the map data to the sensor data. The functions include, in response to detecting the inadequacy in the map data, controlling the vehicle in a second autonomous mode of operation and prompting a user to switch to a manual mode of operation. Controlling the vehicle in the second autonomous mode of operation includes obtaining additional sensor data using the one or more sensors of the vehicle and navigating the vehicle based on the additional sensor data.

DETAILED DESCRIPTION

Figure 1:
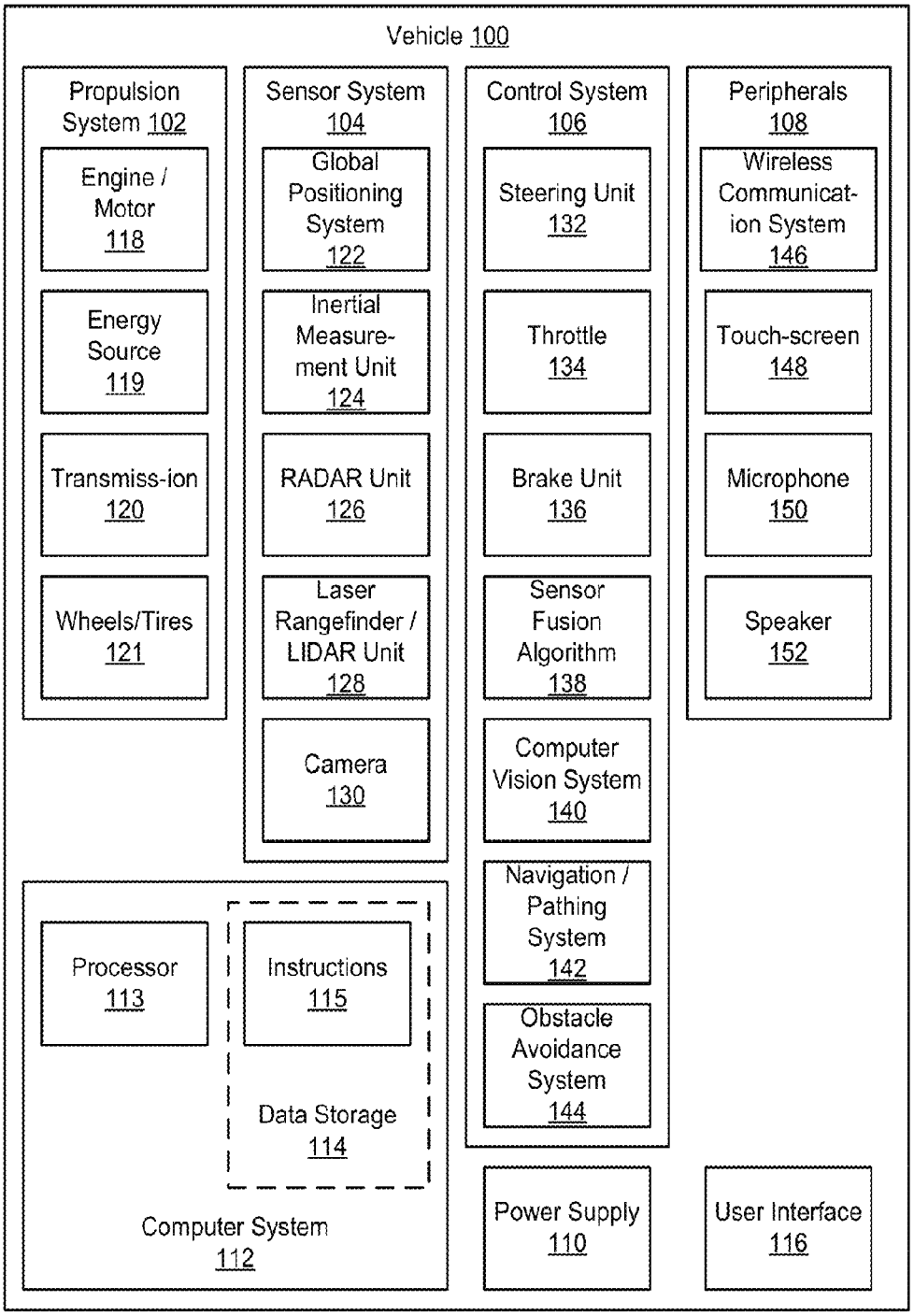
FIG. 1 illustrates a functional block diagram of a vehicle, according to an example embodiment.

Some vehicles can operate autonomously with the use of map data. For example, a person, such as an on-board passenger, can cause a vehicle to switch from manual operation to autonomous operation. In the autonomous mode, the vehicle can use map data to navigate the vehicle. Map data can be, for example, predetermined data that relates to the route of a vehicle or otherwise relates to the surroundings of the vehicle. For example, map data can relate to traffic conditions, road conditions, route information, positioning information, or combinations of these.

In some situations, map data can be inadequate for use in autonomously navigating a vehicle. For example, map data can become outdated over time due to changing road conditions, or the map data may not include sufficient detail about the present or future environment of the vehicle. If the vehicle determines that the map data is inadequate, the vehicle can rely on other sources of information to operate autonomously, or the vehicle can switch (or indicate an option to switch) to a manual mode.

This disclosure provides techniques for operating a vehicle when the map data has been determined to be inadequate. In some implementations, a computer system can control a vehicle in a first autonomous mode of operation (or simply "first autonomous mode"). In the first autonomous mode, the computer system can navigate the vehicle based on map data. While the vehicle is in the first autonomous mode, the computer system can obtain sensor data using one or more sensors of the vehicle. The sensor data can be indicative of an environment of the vehicle. The sensor data can represent nearby objects, such as, for example, traffic signs, lane markers, other vehicles, or pedestrians. The sensor data can also, or instead, represent observations or calculations such as, for example, traffic patterns and geometries of one or more roads near the vehicle.

The computer system can compare the map data to the sensor data in order to detect an inadequacy in the map data. For example, the inadequacy in the map data can be an inconsistency between the sensor data and the map data. In response to detecting the inadequacy in the map data, the computer system can control the vehicle in a second autonomous mode of operation (or simply "second autonomous mode"), and provide an indication of an option to switch to a manual mode of operation (or simply "manual mode"). The indication can serve to notify a person, such as an on-board passenger, of the inadequacy in the map data, and to suggest that the person take control of the vehicle, such as by causing the vehicle to switch to the manual mode. In the second autonomous mode, the computer system can obtain additional sensor data using the one or more sensors, and can navigate the vehicle based on the additional sensor data.

In addition, in the second autonomous mode, the computer system can take precautions, such as, for example, reducing a speed of the vehicle, causing the vehicle to maintain a safer than usual distance from another vehicle, or the like. In this way, the computer system can take measures to enhance the safety of a person, such as an on-board passenger, while the computer system waits for the person to take control of the vehicle.

In the second autonomous mode, if the computer system detects an inactivity in relation to the option to switch to the manual mode, then the computer system can control the vehicle in a third autonomous mode of operation (or simply "third autonomous mode"). For example, if the computer system detects that a predetermined period has passed without the vehicle switching to the manual mode, then the computer system can control the vehicle in the third autonomous mode. In the third autonomous mode, the computer system can obtain further sensor data using the one or more sensors, and can navigate the vehicle based on the further sensor data. In addition, in the third autonomous mode, the computer system can navigate the vehicle with diminished or no use of the map data. In the third autonomous mode, the computer system can take further precautions, such as, for example, stopping the vehicle, navigating the vehicle to a shoulder of a road, following another vehicle at a safe distance, enabling the vehicle's hazard lights, or sending a message to alert appropriate authorities. In this way, when an on-board passenger does not take control of the vehicle in the second autonomous mode, the vehicle can be safely maneuvered and/or parked.

Also discussed are examples of systems that can be used in connection with some disclosed implementations. In some implementations, a system can take the form of an automobile or another suitable vehicle. Suitable vehicles include a car, truck, motorcycle, bus, boat, airplane, helicopter, lawn mower, earthmover, snowmobile, recreational vehicle, amusement park vehicle, farm equipment, construction equipment, tram, golf cart, train, or trolley. Other vehicles are possible as well.

FIG. 1 illustrates a functional block diagram of a vehicle 100. The vehicle 100 can be configured to operate in one of several autonomous modes of operation or in a manual mode of operation. Depending on the desired implementation, the autonomous modes can include one or more of a first autonomous mode, a second autonomous mode, and a third autonomous mode. The first, second, and third autonomous modes are discussed below in further detail. While the vehicle 100 is in one of the autonomous modes, the vehicle 100 can be configured to operate without a need for human interaction. While the vehicle 100 is in the manual mode, the vehicle 100 can be configured to operate under the control of a person, such as an on-board passenger. Other implementations are possible. For example, the vehicle can be configured to operate in a semi-autonomous mode, in which the vehicle can be configured to perform some operations without a need for human interaction and to perform some operations under the control of a person, such as an on-board passenger.

With reference to FIG. 1, the vehicle 100 can include various subsystems such as a propulsion system 102, a sensor system 104, a control system 106, one or more peripherals 108, as well as a power supply 110, a computer system 112, and a user interface 116. The vehicle 100 can include more or fewer subsystems and each subsystem can include multiple elements. Further, each of the subsystems and elements of the vehicle 100 can be interconnected. Thus, one or more of the described functions of the vehicle 100 can be divided into additional functional or physical components, or combined into fewer functional or physical components. In some further examples, additional functional or physical components can be added to the illustration of FIG. 1.

The propulsion system 102 can include components operable to provide powered motion for the vehicle 100. Depending on the implementation, the propulsion system 102 can include an engine/motor 118, an energy source 119, a transmission 120, and wheels/tires 121. The engine/motor 118 can be any combination of an internal combustion engine, an electric motor, steam engine, Stirling engine, or another engines/motor. In some implementations, the engine/motor 118 can be configured to convert the energy source 119 into mechanical energy. In some implementations, the propulsion system 102 can include multiple types of engines and/or motors. For instance, a gas-electric hybrid car can include a gasoline engine and an electric motor. Other implementations are possible.

The energy source 119 can represent a source of energy that can, in full or in part, power the engine/motor 118. That is, the engine/motor 118 can be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source 119 can also, or instead, include any combination of fuel tanks, batteries, capacitors, and flywheels. The energy source 119 can also provide energy for other systems of the vehicle 100.

The transmission 120 can include elements that are operable to transmit mechanical power from the engine/motor 118 to the wheels/tires 121. To this end, the transmission 120 can include a gearbox, clutch, differential, and drive shafts. The transmission 120 can include other elements. The drive shafts can include one or more axles that can be coupled to the one or more wheels/tires 121.

The wheels/tires 121 of the vehicle 100 can be of various forms, such as, for example, those of a unicycle, motorcycle, tricycle, or car. Other wheel/tire forms are possible, such as those including six or more wheels. Any combination of the wheels/tires 121 of the vehicle 100 can be operable to rotate differentially with respect to other wheels/tires 121. The wheels/tires 121 can represent at least one wheel that is attached to the transmission 120 and at least one tire coupled to a rim of the wheel that can make contact with the driving surface. The wheels/tires 121 can include any combination of metal and rubber, or another combination of materials.

The sensor system 104 can include a number of sensors configured to sense information about an environment of the vehicle 100. For example, the sensor system 104 can include a Global Positioning System (GPS) 122, an inertial measurement unit (IMU) 124, a RADAR unit 126, a laser rangefinder/LIDAR unit 128, and a camera 130, among other types of sensors. In addition, the sensor system 104 can include sensors that are configured to monitor internal systems of the vehicle 100. Examples include an $O_2$ monitor, fuel gauge, and engine oil temperature. In addition, the sensor system 104 can include sensors that can sense conditions in a passenger cabin of the vehicle 100, if the vehicle 100 is equipped with a passenger cabin. Examples include physiological sensors and cameras. Other sensors are possible as well.

The GPS 122 can include any number and combination of sensors, and can be configured to estimate a geographic location of the vehicle 100. To this end, the GPS 122 can include a transceiver that is operable to provide information regarding the position of the vehicle 100 with respect to the Earth.

The IMU 124 can include any number and combination of sensors (for example, accelerometers and gyroscopes), and can be configured to sense position and orientation changes of the vehicle 100 based on inertial acceleration.

The RADAR unit 126 can represent a system that utilizes radio signals to sense objects within the environment of the vehicle 100. In some implementations, in addition to sensing the objects, the RADAR unit 126 can additionally be configured to sense the speed of the objects, the heading of the objects, or both.

The laser rangefinder or LIDAR unit 128 can include any number and combination of sensors, and can be configured to sense objects in the environment of the vehicle 100 by using lasers. Depending on the implementation, the laser rangefinder/LIDAR unit 128 can include one or more laser sources, laser scanners, and detectors, among other components. The laser rangefinder/LIDAR unit 128 can be configured to operate in a coherent detection mode (for example, by using heterodyne detection) or an incoherent detection mode.

The camera 130 can include any number and combination of devices, and can be configured to capture images of the environment of the vehicle 100. The camera 130 can be a still camera or a video camera.

The control system 106 can be configured to control operation of the vehicle 100 and its components. To this end, the control system 106 can include various elements, including a steering unit 132, a throttle 134, a brake unit 136, a sensor fusion algorithm 138, a computer vision system 140, a navigation/pathing system 142, and an obstacle avoidance system 144.

The steering unit 132 can include any number and combination of devices, and can be configured to adjust the heading of the vehicle 100.

The throttle 134 can be configured to control, for instance, the operating speed of the engine/motor 118 and, in turn, control the speed of the vehicle 100.

The brake unit 136 can include any number and combination of devices, and can be configured to decelerate the vehicle 100. The brake unit 136 can apply friction to slow the wheels/tires 121. In some implementations, the brake unit 136 can convert the kinetic energy of the wheels/tires 121 to electric current. Other implementations are possible.

The sensor fusion algorithm 138 can be an algorithm or a computer program product storing an algorithm, and can be configured to receive data from the sensor system 104 as an input. The data can include, for example, data representing information sensed at the sensors of the sensor system 104. The sensor fusion algorithm 138 can include, for instance, a Kalman filter, Bayesian network, or other algorithm. The sensor fusion algorithm 138 can further provide various assessments based on the data from the sensor system 104. Depending on the implementation, the assessments can include evaluations of individual objects or features in the environment of the vehicle 100, evaluation of a particular situation, or evaluations of possible impacts based on the particular situation. Other assessments are possible.

The computer vision system 140 can be any system that is operable to process and analyze images captured by the camera 130 in order to identify objects or features in the environment of the vehicle 100. The objects or features can include, for example, traffic signals, traffic signs, roadway boundaries, and obstacles. The computer vision system 140 can use an object recognition algorithm, a Structure From Motion (SFM) algorithm, video tracking, and other computer vision techniques. In some implementations, the computer vision system 140 can be configured to map an environment, track objects, and estimate the speed of objects.

The navigation and pathing system 142 can be configured to determine a driving path for the vehicle 100. The navigation and pathing system 142 can be configured to update the driving path dynamically while the vehicle 100 is in operation. In some implementations, the navigation and pathing system 142 can be configured to use map data to determine the driving path for the vehicle 100. For example, the navigation and pathing system 142 can use data from the sensor fusion algorithm 138 or the GPS 122, or from a different system or component of the vehicle 100, to determine the driving path for the vehicle 100.

The obstacle avoidance system 144 can represent a control system that is configured to identify, evaluate, and avoid or otherwise negotiate potential obstacles in the environment of the vehicle 100.

The peripherals 108 can be configured to allow interaction between the vehicle 100 and external sensors, other vehicles, other computer systems, or a user. For example, the peripherals 108 can include a wireless communication system 146, a touchscreen 148, a microphone 150, and a speaker 152.

In some implementations, the peripherals 108 can enable a user of the vehicle 100 to interact with the user interface 116. To this end, the touchscreen 148 can provide information to a user of vehicle 100. For example, the touchscreen 148 can provide an indication of an option to switch from an autonomous mode of operation to a manual mode of operation. The user interface 116 can be operable to accept input from the user via the touchscreen 148. The touchscreen 148 can be configured to sense at least one of a position and a movement of a user's finger via capacitive sensing, resistance sensing, or a surface acoustic wave process, among other possibilities. The touchscreen 148 can be capable of sensing finger movement in a direction parallel or planar to the touchscreen surface, in a direction normal to the touchscreen surface, or both, and can also be capable of sensing a level of pressure applied to the touchscreen surface. The touchscreen 148 can be formed of one or more translucent or transparent insulating layers and one or more translucent or transparent conducting layers. The touchscreen 148 can take other forms as well.

In some implementations, the peripherals 108 can enable the vehicle 100 to communicate with devices in its environment. The microphone 150 can be configured to receive audio (for example, a voice command or other audio input) from a user of the vehicle 100. Similarly, the speakers 152 can be configured to output audio to the user of the vehicle 100. For example, the speakers 152 can provide an indication of an option to switch from an autonomous mode of operation to a manual mode of operation.

The wireless communication system 146 can be configured to wirelessly communicate with one or more devices directly or via a communication network. For example, the wireless communication system 146 can use 3G cellular communication, such as CDMA, EVDO, GSM/GPRS, or 4G cellular communication, such as WiMAX or LTE. In some implementations, the wireless communication system 146 can communicate with a wireless local area network (WLAN), for example, using WiFi. In some implementations, the wireless communication system 146 can communicate directly with a device, for example, using an infrared link, Bluetooth, or ZigBee. Other wireless protocols, such as various vehicular communication systems, are possible. For example, the wireless communication system 146 can include one or more dedicated short-range communications (DSRC) devices that can include public or private data communications between vehicles and roadside stations.

The power supply 110 can provide power to various components of the vehicle 100 and can represent, for example, a rechargeable lithium-ion or lead-acid battery. In some implementations, one or more banks of such batteries can be configured to provide electrical power. Other power supply materials and configurations are possible. In some implementations, the power supply 110 and energy source 119 can be implemented together, as in some all-electric cars.

Many or all of the functions of the vehicle 100 can be controlled by the computer system 112. The computer system 112 can include at least one processor 113, which can include at least one microprocessor. The at least one processor 113 can execute instructions 115 stored in a non-transitory computer-readable medium, such as the data storage 114. The computer system 112 can also represent multiple computing devices that can control individual components or subsystems of the vehicle 100 in a distributed fashion.

In some implementations, the data storage 114 can contain instructions 115 (for example, program logic) that are executable by the processor 113 to execute various functions of vehicle 100, including those described above in connection with FIG. 1 and those discussed below in connection with FIGS. 3A-3C and 4. The data storage 114 can contain additional instructions as well, including instructions to transmit data to, receive data from, interact with, and/or control one or more of the propulsion system 102, the sensor system 104, the control system 106, and the peripherals 108.

In addition to the instructions 115, the data storage 114 can store map data, which can include roadway maps, path information, and road condition information, among other data. In some implementations, the map data can be used by the vehicle 100 and computer system 112 during the operation of the vehicle 100 in the autonomous, semi-autonomous, or manual modes. In some implementations, the map data can be selectively used by the vehicle 100 during the operation of the vehicle 100 in some of the autonomous modes, and can be used to a lesser extent during operation of the vehicle 100 in other autonomous modes.

The vehicle 100 can include a user interface 116 for providing information to or receiving input from a user of vehicle 100. The user interface 116 can control or enable control of content and/or the layout of interactive images that can be displayed on the touchscreen 148. Further, the user interface 116 can include one or more input/output devices within the set of peripherals 108, such as the wireless communication system 146, the touchscreen 148, the microphone 150, and the speaker 152.

The computer system 112 can control functions of the vehicle 100 based on inputs received from various subsystems (for example, the propulsion system 102, sensor system 104, and control system 106), as well as from the user interface 116. For example, the computer system 112 can utilize input from the control system 106 in order to control the steering unit 132 to avoid an obstacle detected by the sensor system 104 and the obstacle avoidance system 144. Depending upon the implementation, the computer system 112 can be operable to provide control over many aspects of the vehicle 100 and its subsystems.

The components of the vehicle 100 can be configured to work in an interconnected fashion with other components within or outside their respective systems. For instance, in some implementations, the camera 130 can capture a plurality of images that can represent information about a state of an environment of the vehicle 100 operating in an autonomous mode. The environment can include another vehicle, the road on which the vehicle 100 travels (including markings on the road), signs near the vehicle, pedestrians, and the like. The computer vision system 140 can recognize aspects of the environment based on object recognition models stored in data storage 114.

In some implementations, the computer system 112 can control the vehicle 100 in one of several autonomous modes of operation, including first, second, and third autonomous modes. In the first autonomous mode, the computer system can navigate the vehicle based on map data, such as, for example, map data from the global positioning system 122, map data that is stored to the data storage 114, or map data that is received from the wireless communication system 146. While the vehicle 100 is in the first autonomous mode, the computer system 112 can obtain sensor data using one or more sensors in the sensor system 104. The sensor data can be indicative of an environment of the vehicle 100. The sensor data can represent nearby objects, such as, for example, traffic signs, lane markers, other vehicles, or pedestrians. The sensor data can also, or instead, represent observations or calculations such as, for example, traffic patterns and road shapes near the vehicle 100.

The computer system 112 can compare the map data to the sensor data in order to detect an inadequacy in the map data. For example, the inadequacy in the map data can be an inconsistency between the sensor data and the map data. In response to detecting the inadequacy in the map data, the computer system 112 can control the vehicle 100 in the second autonomous mode, and can provide an indication of an option to switch to the manual mode. For example, the indication can be provided by way of the touch screen 148, the speaker 152, and/or the user interface 116. The indication can serve to notify a person, such as an on-board passenger, of the inadequacy in the map data, and to suggest that the person take control of the vehicle 100, such as by causing the vehicle 100 to switch to the manual mode. In the second autonomous mode, the computer system 112 can obtain additional sensor data using the sensor system 104, and can navigate the vehicle 100 based on the additional sensor data.

Also, in the second autonomous mode, the computer system can take precautions, such as, for example, reducing a speed of the vehicle 100, causing the vehicle 100 to maintain a safer than usual distance from other vehicles, or the like. In this way, the computer system 112 can take measures to enhance the safety of persons, such as on-board passengers, while the computer system 112 waits for a person to take control of the vehicle 100.

In some implementations, in the second autonomous mode, if the computer system 112 detects an inactivity in relation to the option to switch to the manual mode, then the computer system 112 can control the vehicle 100 in the third autonomous mode. For example, if the computer system 112 detects that a predetermined period has passed without the vehicle 100 switching to the manual mode, then the computer system 112 can control the vehicle 100 in the third autonomous mode. In the third autonomous mode, the computer system 112 can obtain further sensor data using the one or more sensors, and can navigate the vehicle 100 based on the further sensor data. In addition, in the third autonomous mode, the computer system 112 can navigate the vehicle 100 with diminished or no use of the map data. In the third autonomous mode, the computer system 112 can take further precautions, such as, for example, stopping the vehicle 100 immediately, navigating the vehicle 100 to a shoulder of a road and then stopping the vehicle 100, causing the vehicle 100 to follow another vehicle at a safe distance, enabling hazard lights of the vehicle 100, or sending a message (for example, by way of the wireless communication system 146) to alert appropriate authorities. In this way, when a person, such as an on-board passenger, does not take control of the vehicle 100, the vehicle 100 can be safely maneuvered and/or parked.

Although FIG. 1 shows various components of the vehicle 100, such as, for example, the wireless communication system 146, the computer system 112, the data storage 114, and the user interface 116, as being integrated into the vehicle 100, one or more of these components can be mounted or associated separately from the vehicle 100. For example, the data storage 114 can, in part or in full, exist separate from the vehicle 100. Thus, the vehicle 100 can be provided in the form of device elements that can be located separately or together. The device elements that make up the vehicle 100 can be communicatively coupled together in a wired or wireless fashion.

Figure 2:
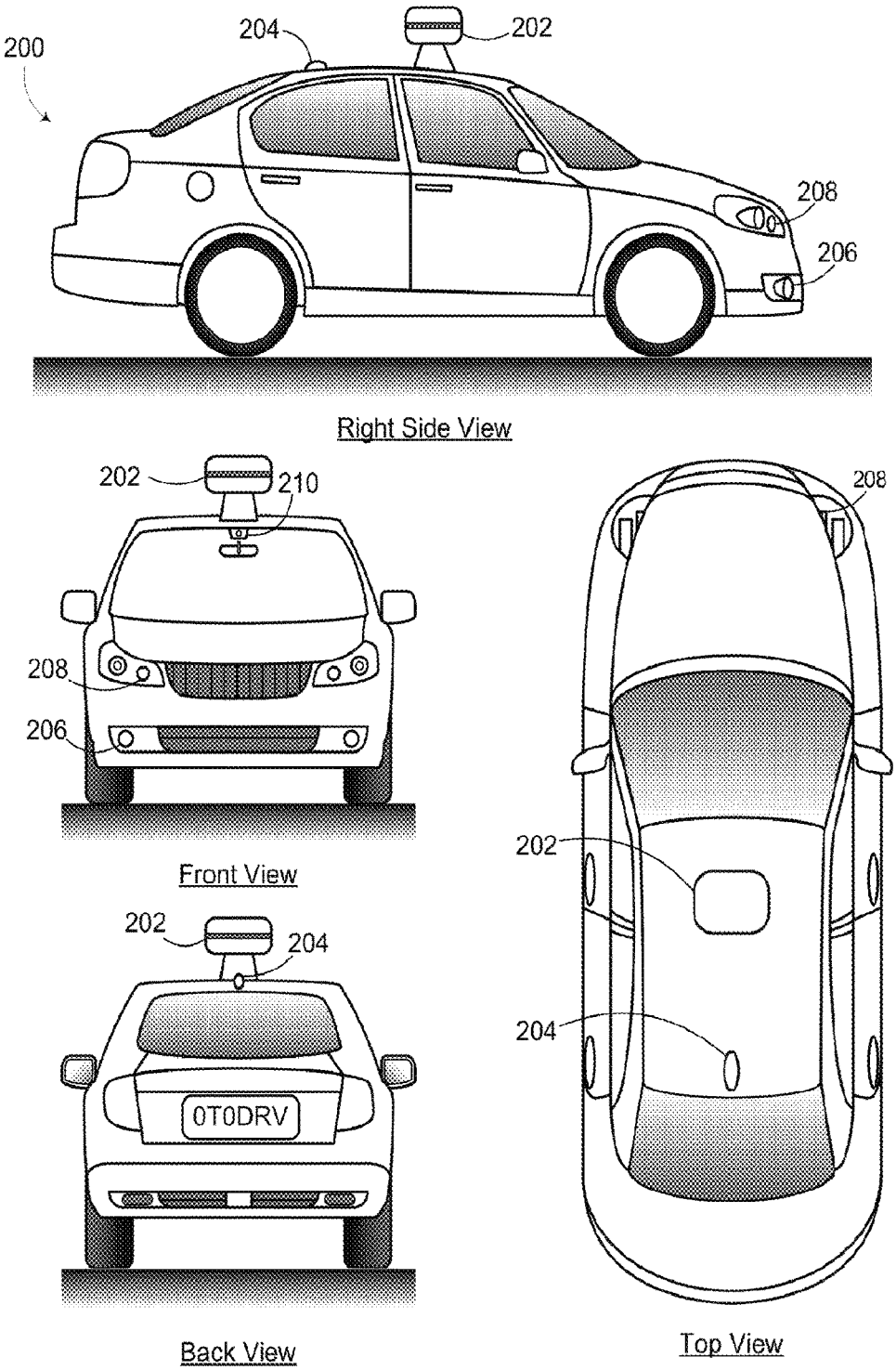
FIG. 2 illustrates a vehicle, according to an example embodiment.

FIG. 2 illustrates a vehicle 200. The vehicle 200 can be similar or identical to the vehicle 100 discussed in reference to FIG. 1. Although the vehicle 200 is illustrated in FIG. 2 as a car, other implementations are possible. For instance, the vehicle 200 can represent a truck, a van, a semi-trailer truck, a motorcycle, a golf cart, an off-road vehicle, or a farm vehicle, among other types of vehicles.

Depending on the implementation, the vehicle 200 can include a sensor unit 202, a wireless communication system 204, a LIDAR unit 206, a laser rangefinder unit 208, and a camera 210. The elements of the vehicle 200 can include some or all of the elements described in connection with FIG. 1.

The sensor unit 202 can include one or more different sensors configured to capture information about an environment of the vehicle 200. For example, the sensor unit 202 can include any combination of cameras, RADARs, LIDARs, range finders, and acoustic sensors. Other types of sensors are possible. Depending on the implementation, the sensor unit 202 can include one or more movable mounts that can be operable to adjust the orientation of one or more sensors in the sensor unit 202. In some implementations, the movable mount can include a rotating platform that can scan sensors so as to obtain information from each direction around the vehicle 200. In another implementation, the movable mount of the sensor unit 202 can be moveable in a scanning fashion within a particular range of angles or azimuths. The sensor unit 202 can be mounted atop the roof of a car, for instance; however other mounting locations are possible. In addition, the sensors of sensor unit 202 can be distributed in different locations and need not be collocated in a single location. Some possible sensor types and mounting locations include the LIDAR unit 206 and the laser rangefinder unit 208. In addition, each sensor of the sensor unit 202 can move or scan independently of other sensors of the sensor unit 202.

The wireless communication system 204 can be located on a roof of the vehicle 200, as depicted in FIG. 2. In some implementations, the wireless communication system 204 can be located elsewhere. The wireless communication system 204 can include wireless transmitters and receivers that can be configured to communicate with devices external or internal to the vehicle 200. In particular, the wireless communication system 204 can include transceivers that can be configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The camera 210 can be any camera (for example, a still camera or a video camera) that is configured to capture a plurality of images of the environment of the vehicle 200. To this end, the camera 210 can be configured to detect visible light, or can be configured to detect light from other portions of the spectrum, such as infrared or ultraviolet light. Other types of cameras are possible as well.

The camera 210 can be a two-dimensional detector, or can have a three-dimensional spatial range. In some implementations, the camera 210 can be, for example, a range detector that is configured to generate a two-dimensional image indicating a distance from the camera 210 to a number of points in the environment. To this end, the camera 210 can use one or more range detecting techniques. For example, the camera 210 can use a structured light technique in which the vehicle 200 illuminates an object in the environment with a predetermined light pattern, such as a grid or checkerboard pattern and uses the camera 210 to detect a reflection of the predetermined light pattern from the object. Based on distortions in the reflected light pattern, the vehicle 200 can determine the distance to the points on the object. The predetermined light pattern can include infrared light or light of another wavelength. As another example, the camera 210 can use a laser scanning technique in which the vehicle 200 emits a laser and scans across a number of points on an object in the environment. While scanning the object, the vehicle 200 can use the camera 210 to detect a reflection of the laser from the object for each point. Based on a duration that it takes for the laser to reflect from the object at each point, the vehicle 200 can determine the distance to the points on the object. As yet another example, the camera 210 can use a time-of-flight technique in which the vehicle 200 emits a light pulse and uses the camera 210 to detect a reflection of the light pulse from an object at a number of points on the object. In particular, the camera 210 can include a number of pixels, and each pixel can detect the reflection of the light pulse from a point on the object. Based on a duration it takes for the light pulse to reflect from the object at each point, the vehicle 200 can determine the distance to the points on the object. The light pulse can be a laser pulse. Other range detecting techniques are possible as well, including stereo triangulation, sheet-of-light triangulation, interferometry, and coded aperture techniques, among others. The camera 210 can take other forms as well.

The camera 210 can be mounted inside a front windshield of the vehicle 200. Specifically, as illustrated, the camera 210 can capture images from a forward-looking view with respect to the vehicle 200. Other mounting locations and viewing angles of the camera 210 are possible, either inside or outside the vehicle 200.

The camera 210 can have associated optics that can be operable to provide an adjustable field of view. Further, the camera 210 can be mounted to the vehicle 200 with a movable mount that can be operable to vary a pointing angle of the camera 210.

Figure 3A:
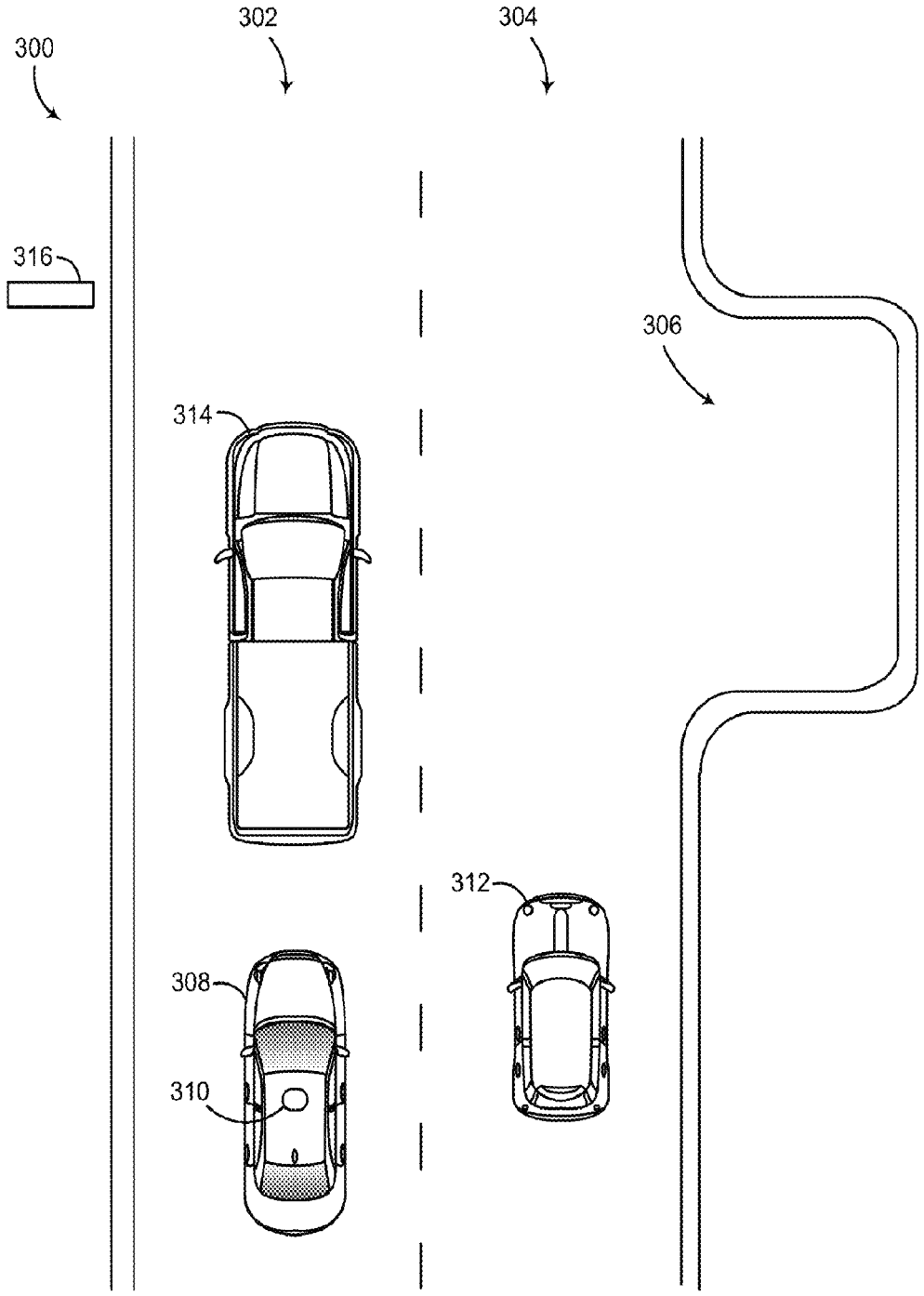
FIGS. 3A-3C illustrate a scenario showing a navigation of a vehicle having inadequate map data, according to an example embodiment.
Figure 3B:
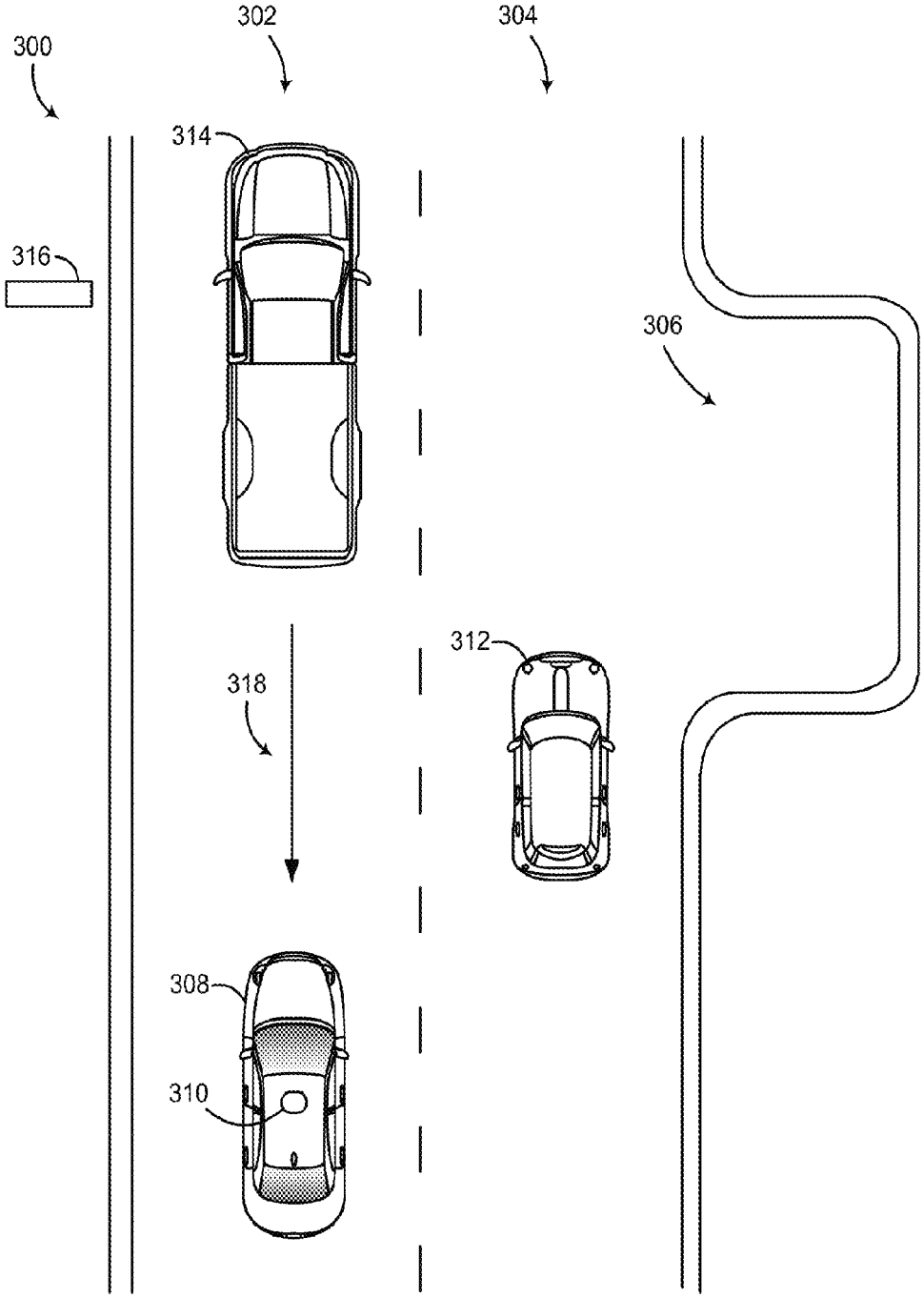
Figure 3C:
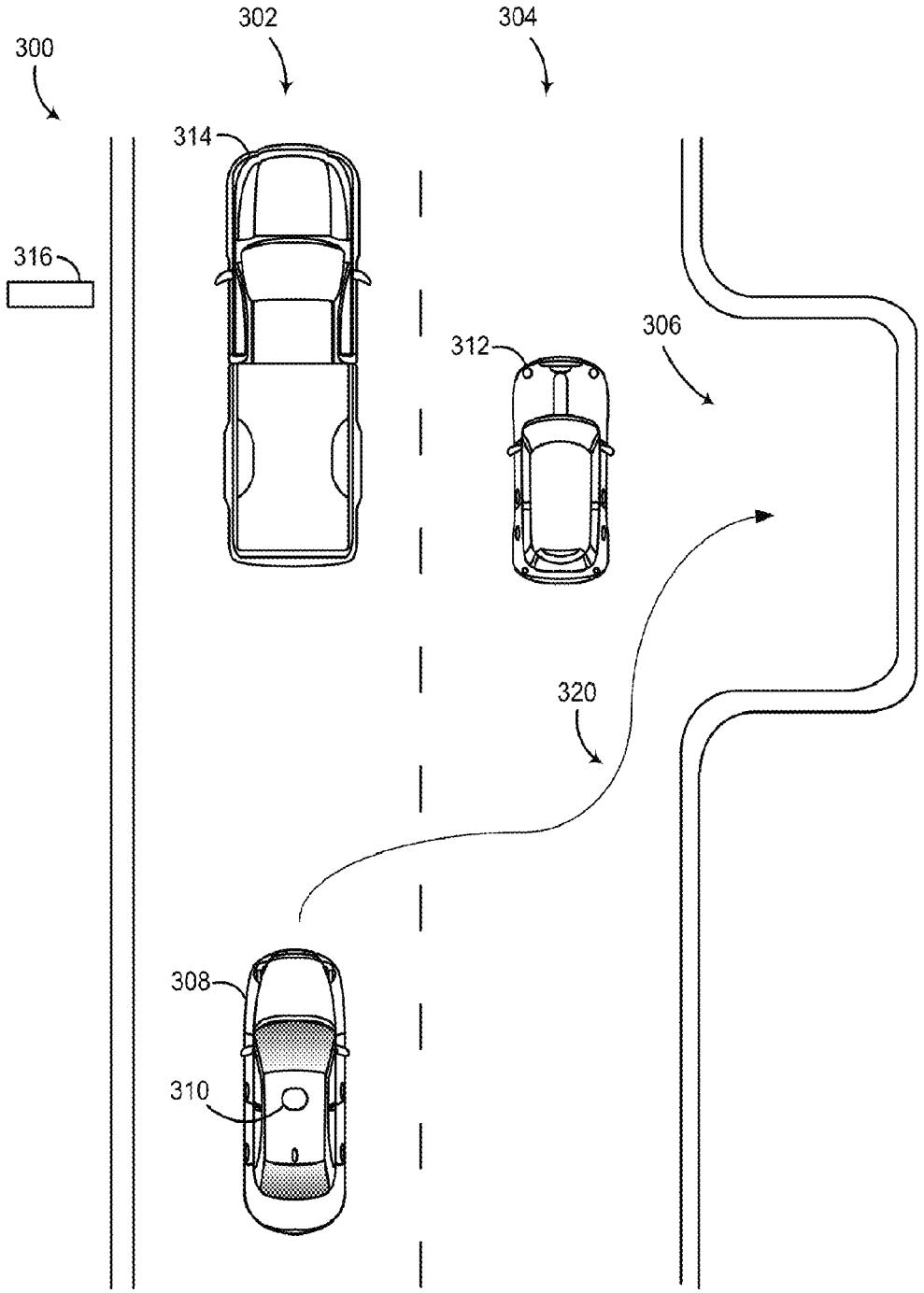

FIGS. 3A-3C illustrate an example of a scenario 300 showing a navigation of a vehicle having inadequate map data. With reference to FIG. 3A, the scenario 300 involves a roadway with a left lane 302, a right lane 304, and a shoulder 306. In the left lane 302 is a vehicle 308. Traveling in front of the vehicle 308 is a truck 314, and traveling to the right of the vehicle 308 is a car 312. Assume that in FIG. 3A, the vehicle 308 is operating in a first autonomous mode. In the first autonomous mode, the vehicle 308 can be navigated based on map data. The map data can include, for example, roadway maps, path information, and road condition information, among other data. The map data can be received by the vehicle 308 while the vehicle is 308 is in motion or prior to the vehicle 308 being in motion. For example, the vehicle 308 can receive map data of a route in real-time, or can receive map data of the route in iterations as the vehicle 308 travels along the route. As another example, the vehicle 308 can receive map data prior to commencing the route. In other words, in some implementations, the map data can be generated and/or received prior to controlling the vehicle 308 in the first autonomous mode.

While the vehicle 308 is in the first autonomous mode, a computer system of the vehicle 308 can obtain sensor data using a sensor unit 310 of the vehicle 308 or any other sensor of the vehicle 308. The sensor data can be indicative of the environment of the vehicle 308 and, accordingly, can represent such aspects of the environment as the roadway, the truck 314 or car 312, and information on the road sign 316. These examples are illustrative only; the sensor data can represent various other aspects of the environment of the vehicle 308.

In addition, when the vehicle 308 is in the first autonomous mode, the vehicle's computer system can compare the map data to the sensor data in order to detect an inadequacy in the map data. In some implementations, the computer system can determine, based on the comparison, whether the difference between the map data and the sensor data exceeds a predetermined threshold. If the difference exceeds the threshold, then the computer system can determine that that the map data is inadequate. In some implementations, the map data can be compared to the sensor data in real-time. In some implementations, the map data can be compared to the sensor data outside real-time.

In response to detecting an inadequacy in the map data, the computer system of the vehicle 308 can control the vehicle 308 in a second autonomous mode, and can provide an indication of an option to switch to a manual mode. The indication can be any suitable indication, such as, for example, a notification by way of a display in a passenger cabin of the vehicle 308, a speaker of the vehicle 308, or a light indicator of the vehicle 308.

Some of the examples above discuss an inadequacy in terms of inadequate map data. An inadequacy can also be found when there is simply no relevant map data for a given area. For example, the vehicle 308 may not receive map data for a given area, or may receive map data that does not include data for the given area.

FIG. 3B shows the vehicle 308 operating in the second autonomous mode. In the second autonomous mode, the computer system of the vehicle 308 can obtain additional sensor data using the sensor unit 310 of the vehicle 308 or any other sensor of the vehicle 308. The additional sensor data can be indicative of any aspect of the environment of the vehicle 308 and, accordingly, can represent such features of the environment as the truck 314, the car 312, the positions of the truck 314 and the car 314 relative to the vehicle 308, the left lane 302 and the right lane 304 of the roadway, the boundary between the left and right lanes, and the information on the road sign 316, for example. For example, in the second autonomous mode, the vehicle can continue to drive safely while transitioning control by estimating the shape and location of the current lane and road and using this information to stay within its lane. To do this lane/road estimation, the vehicle may incorporate several sources of information from sensors on the vehicle, such as features representing where the lane markers are, where other vehicles are traveling, and objects specific to road environments such as traffic signs, cones, and other markers. The vehicle can also take into account where other vehicles/objects are in its vicinity to maintain a safe distance from these vehicles/objects while transitioning control to the human driver. These examples are illustrative only; the additional sensor data can represent various other aspects of the environment of the vehicle 308.

The vehicle 308 can be navigated based on the additional sensor data. In some implementations, the vehicle 308 can be navigated based on a message that conveys a condition of the environment of the vehicle 308. For example, assume that the road sign 316 includes the message "Construction ahead: reduce speed to 20 MPH." The computer system of the vehicle 308 can accordingly reduce the speed of the vehicle 308 in accordance with the message on the road sign 316. As another example, the computer system of the vehicle 308 can detect lane boundaries, such as, for example, the boundaries of the lane 302, and can navigate the vehicle 308 to stay in the lane 302. In some implementations, the computer system can navigate the vehicle 308 based on the additional sensor data and without using the map data. In some implementations, the computer system can navigate the vehicle 308 based on a combination of the additional sensor data and the map data. For example, the computer system of the vehicle 308 can use portions of the map data that are sufficiently consistent with the sensor data, and can use the sensor data to the exclusion of the map data when the sensor data and map data are sufficiently different from each other.

In some implementations, when the vehicle 308 is operating in the second autonomous mode, the computer system of the vehicle 308 can take precautions, such as, for example, reducing a speed of the vehicle 308, causing the vehicle 308 to maintain a safer than usual distance from other vehicles, or the like. In this way, the computer system of the vehicle 308 can take measures to enhance the safety of persons, such as on-board passengers, while the computer system waits for a person to respond to the indication of the option to switch to the manual mode. For example, as illustrated by arrow 318, the vehicle 308 has slowed down and backed off from the truck 314. Other implementations for taking precautions in the second autonomous mode are possible.

In some implementations, after the vehicle 308 begins to operate in the second autonomous mode, the computer system of the vehicle 308 can monitor for an inactivity in relation to the option to switch to the manual mode. If the computer system detects such an inactivity, then the computer system can control the vehicle 308 in a third autonomous mode. For example, if the computer system detects that a predetermined period has passed without the vehicle switching to the manual mode, then the computer system can control the vehicle in the third autonomous mode. As another example, the computer system can use sensors that are in or focused on the passenger cabin of the vehicle 308 to determine a condition of an on-board passenger. For instance, a camera in the passenger cabin can be used to determine whether an on-board passenger has moved (or has moved to a sufficient extent) after the indication was provided. In this way, the computer system of the vehicle 308 can detect the inactivity by detecting an inaction in the passenger cabin of the vehicle 308. Other implementations are possible. For example, the computer system can use data from physiological sensors, such as, for example, heart rate monitors, to monitor for an inactivity.

FIG. 3C shows the vehicle 308 operating in the third autonomous mode. In the third autonomous mode, the computer system of the vehicle 308 can obtain further sensor data using the sensor unit 310 or another sensor of the vehicle 308, and can navigate the vehicle 308 based on the further sensor data. In some implementations, in the third autonomous mode, the computer system of the vehicle 308 can navigate the vehicle 308 with diminished or no use of the map data.

In some implementations, in the third autonomous mode, the computer system of the vehicle 308 can take or can cause the vehicle to take one or more precautious actions in addition to those taken, if any, in the second autonomous mode. As an example of a precautious action, the computer system of the vehicle 308 can immediately stop the vehicle 308, assuming that the computer system determines that it is feasible and safe to do so. As another example of a precautious action, in the third autonomous mode, the computer system can determine a level of safety of parking the vehicle 308 at a location, such as, for example, the shoulder 306 of the roadway. If the computer system determines that the level of safety exceeds a target threshold, then the computer system can cause the vehicle 308 to navigate to the location and park the vehicle 308 at the location, as illustrated by arrow 320. As yet another example of a precautious action, in the third autonomous mode, the computer system of the vehicle 308 can cause the vehicle 308 to follow another vehicle, such as the truck 314, at a safe distance. In this way, the vehicle 308 can take advantage of the behavior of the other vehicle. The vehicle 308 can follow the other vehicle, for example, until the computer system determines that some condition or combination of conditions has been met. For example, the computer system of the vehicle 308 can cause the vehicle 308 to stop following the other vehicle upon a determination that it is no longer safe for the vehicle 308 to continue to follow the other vehicle, upon a determination that following the other vehicle has led or will lead the vehicle 308 sufficiently astray from a target path, or upon a determination of a safe location to park the vehicle 308. As yet another example of a precautious action, in the third autonomous mode, the computer system of the vehicle 308 can enable hazard lights of the vehicle 308 and can reduce the speed of the vehicle 308. As a further example of a precautious action, in the third autonomous mode, the computer system of the vehicle 308 can locate an area to park, for example, by way of a navigation system of the vehicle 308 or a navigation system that is accessible through a communication system of the vehicle 308. The computer system of the vehicle 308 can navigate the vehicle 308 to the area and park the vehicle at the area. As still another example of a precautious action, in the third autonomous mode, the computer system of the vehicle 308 can cause the vehicle 308 to send a message to alert appropriate authorities.

As a further example of a precautious action, in the third autonomous mode, the computer system of the vehicle 308 can continue to navigate the vehicle 308 partially or entirely along a route. The route can be a predetermined route or a route that is generated upon (or after) the vehicle 308 entering the third autonomous mode. For instance, if the computer system is confident in its estimate of the current or future environment of the vehicle 308 based on the sensor data, then the computer system can continue to navigate the vehicle 308 along a route. In some implementations, the computer system can navigate the vehicle 308 partially along the predetermined route, for example, by navigating the vehicle 308 for a certain period of time or for a certain distance. In some implementations, the computer system can navigate the vehicle 308 until the vehicle 308 reaches the destination of the route.

Accordingly, when a person, such as an on-board passenger, does not cause the vehicle 308 to switch from the second autonomous mode to the manual mode, the vehicle 308 can be safely maneuvered and/or parked while the vehicle 308 is in the third autonomous mode. These examples of precautious actions can be implemented together in various combinations. For example, the computer system of the vehicle 308 can turn on hazard lights of the vehicle 308 while the computer system searches for a suitable location to park the vehicle 308. Upon identifying a suitable location to park the vehicle 308, the computer system can turn off the hazard lights and navigate the vehicle 308 to the location. These examples are illustratively only. The vehicle 308 can take (or be caused to take) various other precautious actions in the third autonomous mode; this disclosure contemplates the various other precautious actions.

Figure 4:
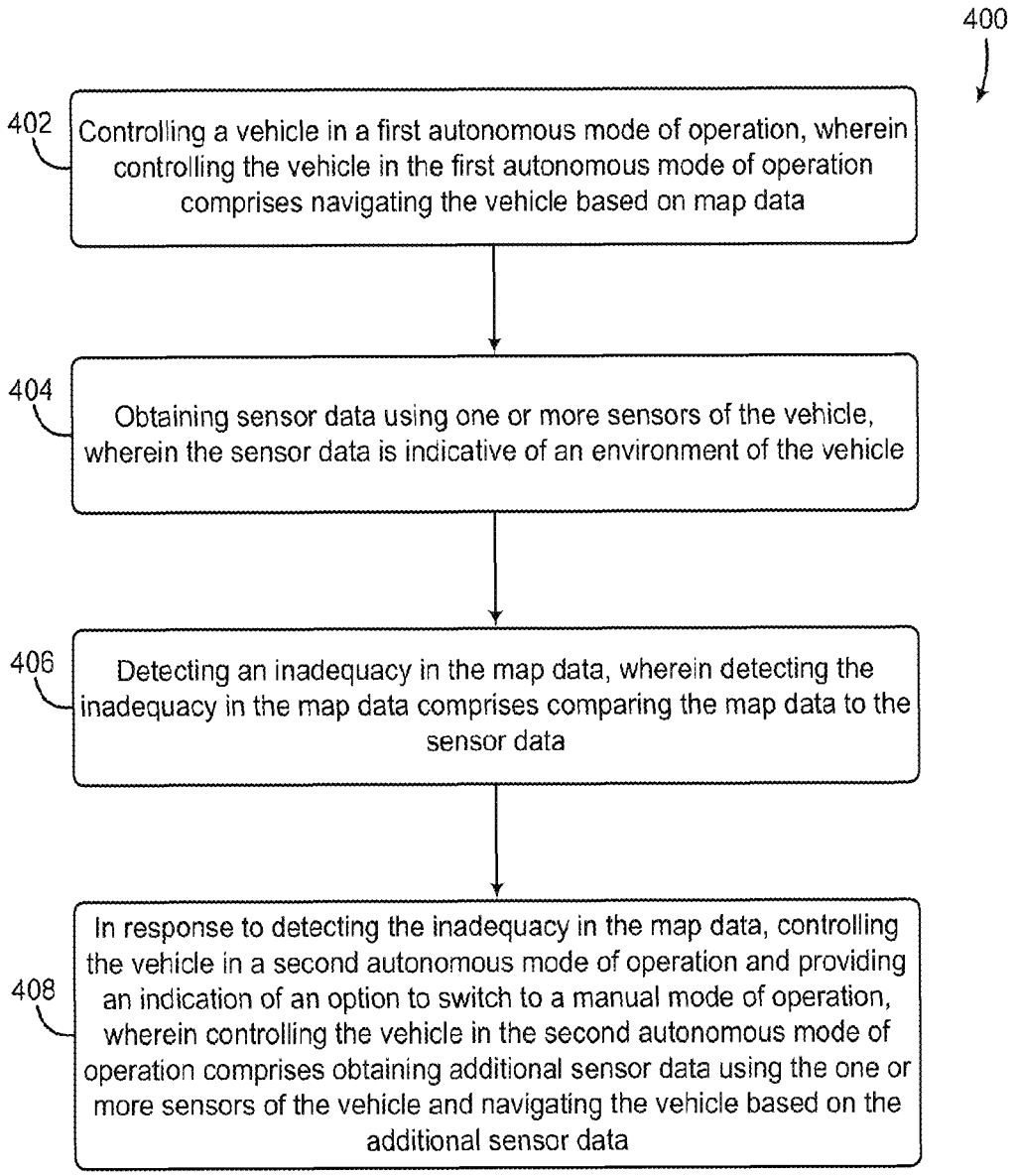
FIG. 4 illustrates an example of a method for controlling a vehicle, according to an example embodiment.

FIG. 4 illustrates an example of a method 400 for controlling a vehicle. The method 400 can be performed using the vehicle 100 shown in FIG. 1, the vehicle 200 shown in FIG. 2, another suitable vehicle, or another suitable system or apparatus.

At block 402, the method 400 includes controlling a vehicle in a first autonomous mode of operation. In the method 400, controlling the vehicle in the first autonomous mode of operation includes navigating the vehicle based on map data. In some implementations, the method 400 can include receiving the map data prior to controlling the vehicle in the first autonomous mode of operation. In some implementations, the map data can be generated prior to controlling the vehicle in the first autonomous mode of operation.

At block 404, the method 400 includes obtaining sensor data using one or more sensors of the vehicle. In the method 400, the sensor data is indicative of an environment of the vehicle.

At block 406, the method 400 includes detecting an inadequacy in the map data. In the method 400, detecting the inadequacy in the map data includes comparing the map data to the sensor data. In some implementations, detecting the inadequacy in the map data includes detecting a difference between the map data and the sensor data. In some implementations, comparing the map data to the sensor data comprises comparing the map data to the sensor data in real-time.

At block 408, the method 400 includes controlling the vehicle in a second autonomous mode of operation and providing an indication of an option to switch to a manual mode of operation, in response to detecting the inadequacy in the map data. Providing the indication can serve to prompt a user to switch to the manual mode of operation. The indication can be provided in various ways. The indication can be provided, for example, by way of any device or system that is provided in connection with the vehicle, such as, for example, any combination of one or more displays (such as a touch-screen display), speakers, indicator lights, and navigation systems. These examples are merely illustrative; the indication can be provided in various other ways. For example, the indication can be provided by way of a mobile device, such as a mobile phone, that is in wireless communication with the vehicle.

In the method 400, controlling the vehicle in the second autonomous mode of operation includes obtaining additional sensor data using the one or more sensors of the vehicle and navigating the vehicle based on the additional sensor data. In some implementations, navigating the vehicle based on the additional sensor data comprises navigating the vehicle without using the map data. In some implementations, the additional sensor data can be indicative of a lane boundary, and navigating the vehicle based on the additional sensor data can include navigating the vehicle based on the lane boundary. In some implementations, the additional sensor data can be indicative of a position of a second vehicle, and navigating the vehicle based on the additional sensor data can include navigating the vehicle based on the position of the second vehicle. In some implementations, the additional sensor data can be indicative of a traffic sign. The traffic sign can present a condition of an environment of the vehicle. Navigating the vehicle based on the additional sensor data can include navigating the vehicle based on the condition.

In some implementations, the method 400 can include detecting an inactivity when the vehicle is in the second autonomous mode of operation. The inactivity can relate to the option to switch to the manual mode of operation. In some implementations, detecting the inactivity can include receiving information that is indicative of a condition in a passenger cabin of the vehicle, and detecting the inactivity based on the information. In some implementations, detecting the inactivity can include detecting an inaction in a passenger cabin of the vehicle. The method 400 can include controlling the vehicle in a third autonomous mode of operation, in response to detecting the inadequacy in the map data. Controlling the vehicle in the third autonomous mode of operation can include obtaining further sensor data using the one or more sensors of the vehicle, and navigating the vehicle based on the further sensor data. In some implementations, navigating the vehicle based on the further sensor data can include determining a level of safety of parking the vehicle at a location, determining that the level of safety exceeds a target threshold, and in response to determining that the level of safety exceeds the target threshold, parking the vehicle at the location. In some implementations, navigating the vehicle based on the further sensor data can include navigating the vehicle without using the map data.

The method 400 of FIG. 4, as well as other methods in the scope of this disclosure, can be carried out in whole or in part by a vehicle and its subsystems. In some implementations, the method 400 can be implemented in whole or in part by one or more computing devices. For example, the method 400 can be implemented in whole or in part by a server system, which receives data from a device that is associated with a vehicle. Other examples of computing devices or combinations of computing devices that can implement the method 400 are possible.

In some implementations, the method 400, as well as other methods in the scope of this disclosure, can be implemented as computer program instructions encoded on a non-transitory computer-readable storage media in a machine-readable format, or on other non-transitory media or articles of manufacture.

Figure 5:
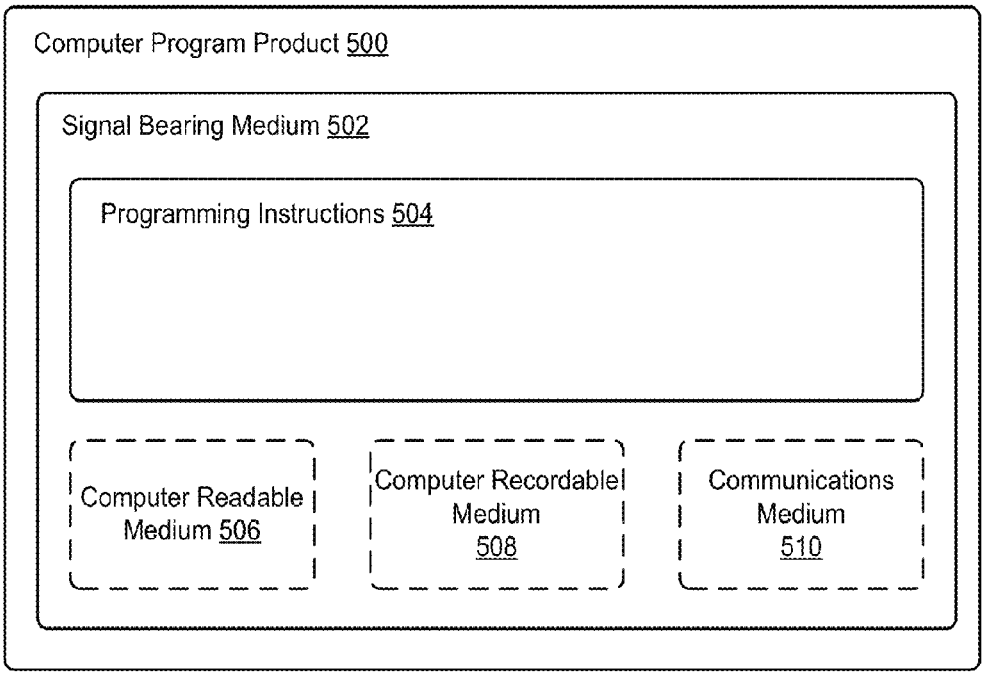
FIG. 5 illustrates a conceptual view of a computer program product, according to an example embodiment.

FIG. 5 illustrates a conceptual view of a computer program product 500. The computer program product 500 can be used to implement methods, such as the method 400, that are in the scope of this disclosure. In some implementations, the computer program product 500 is provided using a signal bearing medium 502. The signal bearing medium 502 can include one or more programming instructions 504 that, when executed by one or more processors can provide functionality or portions of the functionality described above with respect to FIGS. 1-4. In some examples, the signal bearing medium 502 can encompass a computer-readable medium 506, such as, but not limited to, a hard disk drive, a Compact Disc (CD), a Digital Video Disk (DVD), a digital tape, or memory. In some implementations, the signal bearing medium 502 can encompass a computer recordable medium 508, such as, but not limited to, memory, read/write (R/W) CDs, or R/W DVDs. In some implementations, the signal bearing medium 502 can encompass a communications medium 510, such as, but not limited to, a digital and/or an analog communication medium (for example, a fiber optic cable, a waveguide, a wired communications link, or a wireless communication link). Thus, for example, the signal bearing medium 502 can be conveyed by a wireless form of the communications medium 510.

The one or more programming instructions 504 can be, for example, computer executable and/or logic implemented instructions. In some examples, a computing device such as the computer system 112 of FIG. 1 can be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium can also be distributed among multiple data storage elements, which can be remotely located from each other. The computing device that executes some or all of the stored instructions can be a vehicle, such as the vehicle 200 illustrated in FIG. 2. Alternatively, the computing device that executes some or all of the stored instructions can be another computing device, such as a server.

The above detailed description describes various features and functions of the disclosed systems, devices, and methods with reference to the accompanying figures. While various aspects and implementations have been disclosed herein, other aspects and implementations are possible. The various aspects and implementations disclosed herein are for purposes of illustration and are not intended to be limiting, with the true scope and spirit being indicated by the following claims.

What is claimed is:

1. A method comprising:

controlling a vehicle in a first autonomous mode of operation, wherein controlling the vehicle in the first autonomous mode of operation comprises navigating the vehicle based on map data;

obtaining sensor data using one or more sensors of the vehicle, wherein the sensor data is indicative of an environment of the vehicle;

detecting an inadequacy in the map data, wherein detecting the inadequacy in the map data comprises comparing the map data to the sensor data; and in response to detecting the inadequacy in the map data, controlling the vehicle in a second autonomous mode of operation, wherein controlling the vehicle in the second autonomous mode of operation comprises obtaining additional sensor data using the one or more sensors of the vehicle and navigating the vehicle based on the additional sensor data.

2. The method of claim 1, wherein the map data includes one or more of traffic conditions, road conditions, route information, and positioning information.

3. The method of claim 1, wherein detecting the inadequacy in the map data comprises comparing the map data and the sensor data to determine whether a difference between the map data and the sensor data exceeds a predetermined threshold.

4. The method of claim 1, wherein the additional sensor data is indicative of a lane boundary, and wherein navigating the vehicle based on the additional sensor data comprises navigating the vehicle based on the lane boundary.

5. The method of claim 1, wherein the additional sensor data is indicative of a position of a second vehicle, and wherein navigating the vehicle based on the additional sensor data comprises navigating the vehicle based on the position of the second vehicle.

6. The method of claim 5, wherein navigating the vehicle based on the further sensor data comprises increasing a distance between the vehicle and the second vehicle.

7. The method of claim 1, wherein the additional sensor data is indicative of a traffic sign, wherein the traffic sign presents a textual message, and wherein navigating the vehicle based on the additional sensor data comprises navigating the vehicle based on the textual message.

8. The method of claim 1, further comprising:

providing an indication of an option to switch to a manual mode of operation, wherein the indication of an option to switch to a manual mode of operation is provided by one or more of a display, a speaker, an indicator light and a mobile device in wireless communication with the vehicle;

detecting an inactivity when the vehicle is in the second autonomous mode of operation, wherein the inactivity relates to the option to switch to the manual mode of operation; and in response to detecting the inactivity, controlling the vehicle in a third autonomous mode of operation.

9. The method of claim 8, wherein detecting the inactivity comprises:

receiving information that is indicative of a movement of an on-board passenger in the vehicle; and detecting the inactivity based on the information.

10. The method of claim 8, wherein controlling the vehicle in the third autonomous mode of operation comprises:

obtaining further sensor data using the one or more sensors of the vehicle, and navigating the vehicle based on the further sensor data.

11. The method of claim 10, wherein navigating the vehicle based on the further sensor data comprises:

determining a level of safety of parking the vehicle at a location;

determining that the level of safety exceeds a target threshold; and in response to determining that the level of safety exceeds the target threshold, parking the vehicle at the location.

12. The method of claim 10, wherein navigating the vehicle based on the further sensor data comprises enabling hazard lights of the vehicle and reducing a speed of the vehicle.

13. A vehicle comprising:

one or more sensors; and a controller configured to:

receive first sensor data from the one or more sensors, wherein the first sensor data is indicative of an environment of the vehicle when the vehicle is in a first autonomous mode of operation;

receive second sensor data from the one or more sensors, wherein the second sensor data is indicative of an environment of the vehicle when the vehicle is in a second autonomous mode of operation;

control the vehicle in the first autonomous mode of operation by at least navigating the vehicle based on map data;

detect an inadequacy in the map data by at least comparing the map data to the first sensor data; and in response to detecting the inadequacy in the map data, control the vehicle in the second autonomous mode of operation by at least navigating the vehicle based on the second sensor data.

14. The vehicle of claim 13, wherein the additional sensor data is indicative of a traffic sign, wherein the traffic sign presents a textual message, and wherein navigating the vehicle based on the additional sensor data comprises navigating the vehicle based on the textual message.

15. The vehicle of claim 13, wherein the controller is further configured to:

provide an indication of an option to switch to a manual mode of operation, wherein the indication of an option to switch to a manual mode of operation is provided by one or more of a display, a speaker, an indicator light and a mobile device in wireless communication with the vehicle;

detect an inactivity when the vehicle is in the second autonomous mode of operation, wherein the inactivity relates to the option to switch to the manual mode of operation; and in response to detecting the inactivity, control the vehicle in a third autonomous mode of operation by at least causing one or more precautious actions to be performed.

16. The vehicle of claim 15, wherein the one or more precautious actions comprises one or more of parking the vehicle, causing the vehicle to follow another vehicle, reducing a speed of the vehicle, navigating the vehicle along at least a part of a route, sending an alert message, and enabling one or more hazard lights of the vehicle.

17. The vehicle of claim 13, wherein the one or more sensors comprise one or more of a camera, a radar system, a LIDAR system, a global positioning system, and an inertial measurement unit.

18. A non-transitory computer-readable storage medium having stored thereon instructions, that when executed by a computing device, cause the computing device to carry out functions comprising:

controlling a vehicle in a first autonomous mode of operation, wherein controlling the vehicle in the first autonomous mode of operation comprises navigating the vehicle based on map data;

obtaining sensor data using one or more sensors of the vehicle, wherein the sensor data is indicative of an environment of the vehicle;

detecting an inadequacy in the map data, wherein detecting the inadequacy in the map data comprises comparing the map data to the sensor data; and in response to detecting the inadequacy in the map data, controlling the vehicle in a second autonomous mode of operation, wherein controlling the vehicle in the second autonomous mode of operation comprises obtaining additional sensor data using the one or more sensors of the vehicle and navigating the vehicle based on the additional sensor data.

19. The non-transitory computer-readable storage medium of claim 18, wherein the functions further comprise:

providing an indication of an option to switch to a manual mode of operation, wherein the indication of an option to switch to a manual mode of operation is provided by one or more of a display, a speaker, an indicator light and a mobile device in wireless communication with the vehicle;

detecting an inactivity when the vehicle is in the second autonomous mode of operation, wherein the inactivity relates to the option to switch to the manual mode of operation; and in response to detecting the inactivity, controlling the vehicle in a third autonomous mode of operation.

20. The non-transitory computer-readable storage medium of claim 18, wherein the additional sensor data is indicative of a traffic sign, wherein the traffic sign presents a textual message, and wherein navigating the vehicle based on the additional sensor data comprises navigating the vehicle based on the textual message.

*21. A method comprising:*

*controlling a vehicle in a first autonomous mode of operation, wherein controlling the vehicle in the first autonomous mode of operation comprises navigating the vehicle based on map data;*

*obtaining sensor data using one or more sensors of the vehicle, wherein the sensor data is indicative of an environment of the vehicle;*

*detecting an inadequacy in the map data, wherein detecting the inadequacy in the map data comprises comparing the map data to the sensor data; and*

*in response to detecting the inadequacy in the map data, controlling the vehicle in a second autonomous mode of operation, wherein controlling the vehicle in the second autonomous mode of operation comprises navigating the vehicle based on additional sensor data obtained by the one or more sensors of the vehicle.*

*22. The method of claim 21, wherein the map data includes one or more of traffic conditions, road conditions, route information, and positioning information.*

*23. The method of claim 21, wherein detecting the inadequacy in the map data comprises comparing the map data and the sensor data to determine whether a difference between the map data and the sensor data exceeds a predetermined threshold.*

*24. The method of claim 21, wherein the additional sensor data is indicative of a lane boundary, and wherein navigating the vehicle based on the additional sensor data comprises navigating the vehicle based on the lane boundary.*

*25. The method of claim 21, wherein the additional sensor data is indicative of a position of a second vehicle, and wherein navigating the vehicle based on the additional sensor data comprises navigating the vehicle based on the position of the second vehicle.*

*26. The method of claim 25, wherein navigating the vehicle based on the further sensor data comprises increasing a distance between the vehicle and the second vehicle.*

*27. The method of claim 21, wherein the additional sensor data is indicative of a traffic sign, wherein the traffic sign presents a textual message, and wherein navigating the vehicle based on the additional sensor data comprises navigating the vehicle based on the textual message.*

*28. The method of claim 21, further comprising:*

*providing an indication of an option to switch to a manual mode of operation, wherein the indication of an option to switch to a manual mode of operation is provided by one or more of a display, a speaker, an indicator light and a mobile device in wireless communication with the vehicle;*

*detecting an inactivity when the vehicle is in the second autonomous mode of operation, wherein the inactivity relates to the option to switch to the manual mode of operation; and*

*in response to detecting the inactivity, controlling the vehicle in a third autonomous mode of operation.*

*29. The method of claim 28, wherein detecting the inactivity comprises:*

*receiving information that is indicative of a movement of an on-board passenger in the vehicle; and*

*detecting the inactivity based on the information.*

*30. The method of claim 28, wherein controlling the vehicle in the third autonomous mode of operation comprises:*

*obtaining further sensor data using the one or more sensors of the vehicle, and*

*navigating the vehicle based on the further sensor data.*

*31. The method of claim 30, wherein navigating the vehicle based on the further sensor data comprises:*

*determining a level of safety of parking the vehicle at a location;*

*determining that the level of safety exceeds a target threshold; and*

*in response to determining that the level of safety exceeds the target threshold, parking the vehicle at the location.*

*32. The method of claim 30, wherein navigating the vehicle based on the further sensor data comprises enabling hazard lights of the vehicle and reducing a speed of the vehicle.*

*33. A vehicle comprising:*

*one or more sensors; and*

*a controller configured to:*

*receive sensor data from the one or more sensors, wherein the sensor data is indicative of an environment of the vehicle when the vehicle is in a first autonomous mode of operation;*

*control the vehicle in the first autonomous mode of operation by at least navigating the vehicle based on map data;*

*detect an inadequacy in the map data by at least comparing the map data to the sensor data; and*

*in response to detecting the inadequacy in the map data, control the vehicle in the second autonomous mode of operation by at least navigating the vehicle based on the sensor data.*

*34. The vehicle of claim 33, wherein the sensor data is indicative of a traffic sign, wherein the traffic sign presents a textual message, and wherein navigating the vehicle based on the additional sensor data comprises navigating the vehicle based on the textual message.*

*35. The vehicle of claim 33, wherein the controller is further configured to:*

*provide an indication of an option to switch to a manual mode of operation, wherein the indication of an option to switch to a manual mode of operation is provided by one or more of a display, a speaker, an indicator light and a mobile device in wireless communication with the vehicle;*

*detect an inactivity when the vehicle is in the second autonomous mode of operation, wherein the inactivity relates to the option to switch to the manual mode of operation; and*

*in response to detecting the inactivity, control the vehicle in a third autonomous mode of operation by at least causing one or more precautious actions to be performed.*

*36. The vehicle of claim 35, wherein the one or more precautious actions comprises one or more of parking the vehicle, causing the vehicle to follow another vehicle, reducing a speed of the vehicle, navigating the vehicle along at least a part of a route, sending an alert message, and enabling one or more hazard lights of the vehicle.*

*37. The vehicle of claim 33, wherein the one or more sensors comprise one or more of a camera, a radar system, a LIDAR system, a global positioning system, and an inertial measurement unit.*

*38. A non-transitory computer-readable storage medium having stored thereon instructions, that when executed by a computing device, cause the computing device to carry out functions comprising:*

*controlling a vehicle in a first autonomous mode of operation, wherein controlling the vehicle in the first autonomous mode of operation comprises navigating the vehicle based on map data;*

*obtaining sensor data using one or more sensors of the vehicle, wherein the sensor data is indicative of an environment of the vehicle;*

*detecting an inadequacy in the map data, wherein detecting the inadequacy in the map data comprises comparing the map data to the sensor data; and*

*in response to detecting the inadequacy in the map data, controlling the vehicle in a second autonomous mode of operation, wherein controlling the vehicle in the second autonomous mode of operation comprises navigating the vehicle based on additional sensor data obtained by the one or more sensors of the vehicle.*

*39. The non-transitory computer-readable storage medium of claim 38, wherein the functions further comprise:*

*providing an indication of an option to switch to a manual mode of operation, wherein the indication of an option to switch to a manual mode of operation is provided by one or more of a display, a speaker, an indicator light and a mobile device in wireless communication with the vehicle;*

*detecting an inactivity when the vehicle is in the second autonomous mode of operation, wherein the inactivity relates to the option to switch to the manual mode of operation; and*

*in response to detecting the inactivity, controlling the vehicle in a third autonomous mode of operation.*

*40. The non-transitory computer-readable storage medium of claim 18, wherein the additional sensor data is indicative of a traffic sign, wherein the traffic sign presents a textual message, and wherein navigating the vehicle based on the additional sensor data comprises navigating the vehicle based on the textual message.*

* * * * *